United States Patent Office 2,930,794
Patented Mar. 29, 1960

2,930,794
PROCESS FOR THE PRODUCTION OF BENZTHIAZOLE-2-DICYCLOALKYL-SULPHENAMIDES

Friedrich Lober, Leverkusen-Bayerwerk, Helmut Freytag, Koln-Stammheim, and Ernst Kracht, Leverkusen-Bayerwerk, Germany, assignors to Farbenfabriken Bayer Aktiengesellschaft, Leverkusen, Germany, a corporation of Germany No Drawing. Application August 12, 1958
Serial No. 754,534

1 Claim. (Cl. 260—306.6)

This invention relates to benzthiazole-2-dicycloalkyl-sulfenamides and to a process for their production. It has already been proposed to use benzthiazole-2-dicycloalkyl sulphenamides as vulcanisation accelerators. These accelerators are characterised by yielding processing reliability superior to that obtained with other known sulphenamide accelerators. This valuable property can however only be fully utilised in rubber mixtures if these sulphenamides can be so manufactured as to be free from contaminating by-products, especially free from benzthiazole disulphide.

For the production of sulphenamides from mercaptobenzthiazole and amines, a large number of processes have already been proposed in which the condensation by oxidation of mercaptobenzthiazole and corresponding amines is effected with the aid of suitable oxidising agents. When these processes are applied to dicycloalkyl amines, especially to dicyclohexyl amine, the purity of the final products and the yields of sulphenamide are not satisfactory because the dicycloalkylamines are substantially insoluble in water. It has also already been proposed that N-chloramines of preferably secondary amines should be reacted with salts of mercaptobenzthiazole in aqueous medium. The chloramines, such as for example those of diethylamine, piperidine and morpholine, are difficult to handle on a large scale, since they tend to decompose spontaneously in the presence of water or at elevated temperature and produce strong irritation causing tears, and also considerable quantities of impurities, especially benzthiazole disulphide, are formed with this type of reaction in addition to the corresponding sulphenamides, the yields of which are not within the acceptable limits for a commercial process (see German patent specification No. 586,351 and U.S.A. patent specification No. 2,758,995).

Attempts have also been made to obviate these disadvantages of the chloramine process by carrying out the reaction between mercaptobenzthiazole and the N-chloramine, for example N-chloromorpholine, in inert solvents, such as benzene or toluene, in the absence of water and in the presence of suitable acid acceptors. However, processes using solvents are always very costly when carried out on a commercial scale, and in addition there is the comparatively complicated isolation of the final product, for example by distillation, and subsequent purification (see British specification No. 713,496; 737,252 and 753,803).

It is an object of the present invention to provide an economic process for the production of benzthiazol-2-dicycloalkylsulfenamides. Another object is to provide a process wherein the benzthiazol-2-dicycloalkylsulfenamides are obtained in a very pure form in good yields. Further objects will appear hereinafter.

It has now been found that these objects can be attained in accordance with the present invention if N-dicycloalkyl amines are reacted with aqueous alkali hypochlorite solution to form the corresponding N-chlorodicycloalkyl amines, and the N-chlorodicycloalkyl amines are reacted in the aqueous phase and in the presence of water-soluble aliphatic ketones with the alkali metal or alkaline earth metal salts of 2-mercaptobenzthiazole.

Dicycloalkyl amines which are suitable for the process of the invention are those of which the cycloalkyl radicals (which may be substituted) contain 5 to 7 carbon ring atoms.

The first stage of the process of the invention, which is the reaction of the dicycloalkyl amine with the aqueous alkali hypochlorite solution, takes place at temperatures in the range between 0 and 70° C. preferably 15–50° C.

It is surprising that when this process is used the N-chlorodicycloalkyl amine is obtained with very good yields (96 to 99% of the theoretical). The product obtained is very pure. The N-chlorodicycloalkyl amines which are obtained also surprisingly have very good stability, so that they are completely safe to handle and have very good storage stability. The N-chlorodicycloalkyl amines are resistant to water and aqueous alkalies and only have a weak amine-like odour.

The second reaction stage, which is the reaction of N-chlorodicycloalkyl amines with the alkali metal or alkaline earth metal salts of mercaptobenzthiazole is carried out in a ketone which is miscible with water, for example acetone, methyl ethyl ketone, methyl propyl ketone or diacetone alcohol. In one preferred embodiment of the process of the invention, the N-chlorodicycloalkyl amines are dissolved in the ketone, it being advantageous to use a ratio between chloramine and ketone of 1:1 to 1:2 parts by volume, and then the salt of the mercaptobenzthiazole in aqueous solution is gradually added. The salt of the mercaptobenzthiazole can be prepared from the mercaptobenzthiazole and equimolar quantities of aqueous alkali metal or alkaline earth metal hydroxide. The water content of the aqueous solution of the mercaptobenzthiazole salt thereby obtained is advantageously brought to a ratio of 1:1.5 to 2:15 parts by volume with the ketone used for dissolving the N-chlorodicycloalkyl amine. It is also preferred for the reaction to be carried out at temperatures between 0 and 70° C. preferably 15–50° C. If desired, it is also possible to use lower temperatures, but then the reaction takes more time. In order to obtain the highest possible yields and the best possible purity of the desired final product, the aqueous solution of the mercaptobenzthiazole salt can also have added thereto an excess of 0.05 to 0.25 mol of alkali metal or alkaline earth metal hydroxide per mol of mercaptobenzthiazole.

The benzthiazole-2-dicycloalkyl sulphenamides can be worked up by the usual processes.

EXAMPLE 1

(a) 1,828 grams of 99% dichlorohexyl amine are placed in a three-necked flask, which is placed in a water bath at an internal temperature of 38° C. 5,250 cc. of sodium hypochlorite solution with a content of 156 g. of NaOCl per 1000 cc. of solution are added dropwise over a period of 4 hours while stirring vigorously. The water bath is kept at a temperature of 35° C. during this period so that the temperature of the mixture cannot exceed 38 to 40° C. The reaction is slightly exothermic. The dicyclohexyl amine becomes bluish-green to dull green in colour at the beginning of the drop-wise addition of the sodium hypochlorite solution and later the mixture becomes from beige to light brown in colour. Stirring is continued for another 1 to 2 hours at the temperature indicated and the reaction mixture is introduced while still warm into a separating funnel and allowed to settle, and the aqueous solution is withdrawn from the bottom. In this way, there are obtained 2,147 grams of crude chloramine and 5,080 cc. of aqueous alkaline spent solution. The moisture content of the chloramine is about 1%. For controlling the reaction and the content of chloramine in the final product, mass analysis was carried out to determine the chloramine by iodometry, its amine content by acidimetry and the sodium hydroxide solution present in the aqueous spent solution was determined in the usual way.

| | |
|---|---|
| Chloramine content _____percent__ | 97.5 |
| Amine content _____do____ | 1.0 |
| Sodium hydroxide in final solution: | |
| 409.5 g. NaOH _____mols__ | 10.25 |
| Theoretical _____do____ | 10.00 |

*Analysis.*—Calculated for $C_{22}H_{22}NCl$ (mol weight 215.5): N, 6.49%; Cl, 16.47%. Found: N, 6.50%; Cl, 16.30%.

The chloramine has good solubility in alcohols, apart from methanol, and in ketones, aromatic hydrocarbons and chlorinated hydrocarbons.

*Storability at room-temperature (20° C.)*

| Content after | 0 days | 12 days | 45 days |
|---|---|---|---|
| | Percent | Percent | Percent |
| N-chlorodicyclohexyl amine | 97.5 | 97.4 | 92.0 |

(b) 400 cc. of acetone are added to 222 g. of 97% crude separated N-chlorodicyclohexyl amine which has an amine content of about 0.8 to 1%. An aqueous 2-mercapto-benzthiazole-sodium solution, which is obtained in the usual way from 167 grams of 2-mercaptobenzthiazole, 1.12 mols of caustic soda in the form of substantially 40% commercial sodium hydroxide solution and 240 cc. of water is added dropwise to the mixture of N-chloramine, which is heated to 30° C., the addition being carried out over a period of about 60 to 80 minutes at 30 to 35° C. while stirring vigorously and if necessary with gentle external cooling. After the addition is complete, stirring is continued for another 30 minutes as 40 to 50° C., the mixture is cooled to 10° C. and the precipitated sulphenamide is filtered off with suction. The filter residue is thereafter washed with 2% acetic acid, and finally with water for removing the sodium chloride until the washing water no longer shows a chlorine reaction. In this way, 292 grams of benzthiazole-2-dicyclohexyl sulphenamide were obtained (M.P. 97–99° C.). After recrystallisation from alcohol in the presence of active carbon a pure product is obtained (M.P. 103–104° C.).

Instead of the 2 mercaptobenzthiazole-sodium there can be used an equivalent amount of the potassium salt, and instead of the acetone there can be used another water-miscible ketone such as methyl-ethyl-ketone, methyl-propyl-ketone or diacetone alcohol.

EXAMPLE 2

222 grams of 97% of crude separated N-chlorodicyclohexyl amine with an amine content of about 0.8 to 1% are placed in 500 cc. of acetone at 35° C. Over a period of 1 hour and while stirring well and maintaining a temperature of 35 to 40° C., there is added dropwise a 2-mercaptobenzthiazole-calcium solution which has been prepared from 167 grams of 2-mercaptobenzthiazole, 375 cc. of water and about 60 grams of calcium hydroxide while stirring and by heating to 98 to 100° C. and by subsequent filtration and rinsing with 25 cc. of hot water. During the dropwise addition of this aqueous solution, the mixture gradually becomes cloudy, and, towards the completion of the addition of the solution, there is sudden crystallisation of the reaction mixture. Stirring is continued for 1 hour at 40° C. and, after cooling of the reaction mixture to 10° C., the precipitated sulphenamide is filtered with suction from the mother liquor. By means of washing with 2% acetic acid and thereafter with water, the last traces of the mother liquor and the common salt are removed from the reaction product. 278 grams of light yellow benzthiazole-2-dicyclohexyl sulphenamide (M.P. 96.5 to 98° C.) are obtained.

That fraction of the benzthiazole-2-dicyclohexyl sulphenamide which is insoluble in ether and which is produced as described in Examples 1(b) and 2 comprises a proportion up to 0.5% by weight and consists substantially of benzthiazole disulphide.

By means of the process described in Examples 1(b) and 2, benzthiazole-2-dicyclopentyl sulphenamide (M.P.) 75 to 76° C.) can be obtained by using N-chlorodicyclopentyl amine instead of N-chlorodicyclohexyl amine; the fraction thereof which is insoluble in ether is between 0.4 and 0.6%.

The N-chlorodicyclopentyl amine can be obtained as follows:

385 grams of dicyclopentyl amine are placed in a three-necked flask at 10° C. 1,330 cc. of sodium hypochlorite solution with a content of 158 grams of NaOCl per 1000 cc. of solution are added dropwise at 5 to 15° C. over a period of about 2 hours while stirring well. After the stirring has been continued for 1 hour at room temperature, the reaction mixture is introduced into a separating funnel and allowed to settle. The aqueous layer of solution is drawn off, and there are obtained 460 grams of N-chlorodicyclopentyl amine. The chloramine is a yellowish-brown clear liquid.

| | |
|---|---|
| Chloramine content _____percent__ | 97.35 |
| Amine content _____do____ | about 1.0 |
| Sodium hydroxide in final solution: | |
| 101.5 grams _____mols__ | about 2.5 |
| Theoretical _____do____ | 2.5 |

*Analysis.*—Calculated for $C_{10}H_{18}NCl$ (molecular weight 187.5): N, 7.47%; Cl, 18.93%. Found: N. 7.37%; Cl, 18.60%.

The N-chlorodicycloheptyl amine can be produced in the same way from dicycloheptyl amine.

We claim:

A process for the production of benzthiazole-2-dicycloalkyl sulphenamides, which comprises reacting N-dicycloalkyl amines, the cycloalkyl radicals of which contain 5 to 7 carbon ring atoms with an alkali metal hypochlorite solution to form the corresponding N-chlorodicycloalkyl amines and reacting the latter in the aqueous phase in the presence of acetone with a member selected from the group consisting of the alkali metal and alkaline earth metal salts of 2-mercaptobenzthiazole.

References Cited in the file of this patent

UNITED STATES PATENTS 2,581,921      Alliger _____ Jan. 8, 1952